United States Patent
Hari Krishnan

(10) Patent No.: US 10,833,971 B1
(45) Date of Patent: Nov. 10, 2020

(54) SYSTEMS AND METHODS FOR PROVIDING CLUSTERED HEALTH CHECKS

(71) Applicant: T-Mobile USA, Inc., Bellevue, WA (US)

(72) Inventor: Sandeep Shankar Hari Krishnan, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/409,143

(22) Filed: May 10, 2019

(51) Int. Cl.
  G06F 15/16 (2006.01)
  H04L 12/26 (2006.01)
  H04L 29/08 (2006.01)

(52) U.S. Cl.
  CPC ............ *H04L 43/50* (2013.01); *H04L 67/146* (2013.01)

(58) Field of Classification Search
  CPC .............................. H04L 43/50; H04L 67/146
  See application file for complete search history.

(56) References Cited

U.S. PATENT DOCUMENTS

| 10,542,071 B1* | 1/2020 | Matthews | H04L 65/1006 |
| 2010/0070448 A1* | 3/2010 | Omoigui | H01L 27/14647 706/47 |
| 2016/0351070 A1* | 12/2016 | Aillon-Sohl | G16H 40/67 |

\* cited by examiner

*Primary Examiner* — Thanh T Nguyen
(74) *Attorney, Agent, or Firm* — Lee & Hayes, P.C.

(57) ABSTRACT

Systems and methods for providing clustered health checks are described herein. The systems and methods enable a user to select one or more selectable links to group together. The selectable links are associated with computing resources used by an application. Once selected, a parallel executor server receives the links and issues a health check command code to the computing resources associated with the group. The computing resources can be grouped together based on various reasons. The selectable links can be rendered in a graphical user interface of a health check application or an Internet browser.

20 Claims, 6 Drawing Sheets

SYSTEMS AND METHODS FOR PROVIDING CLUSTERED HEALTH CHECKS

BACKGROUND

Modern applications are typically designed in a way that the functionality provided to the application is scaled across various servers and/or data stores. To maintain the functionality, and to reduce the probability that customers would have their service interrupted, the status of the various servers and/or data stores is often checked on a regular basis. In some conventional systems, the application designers/engineers, after deploying the application on multiple servers and/or data stores, test the servers and/or data stores to ensure that the "health" of the servers and/or data stores are sufficient before closing the development cycle. In modern systems, applications can be scaled across hundreds or thousands of nodes, therefore making it difficult to check the status of one or more of the servers and/or data stores.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
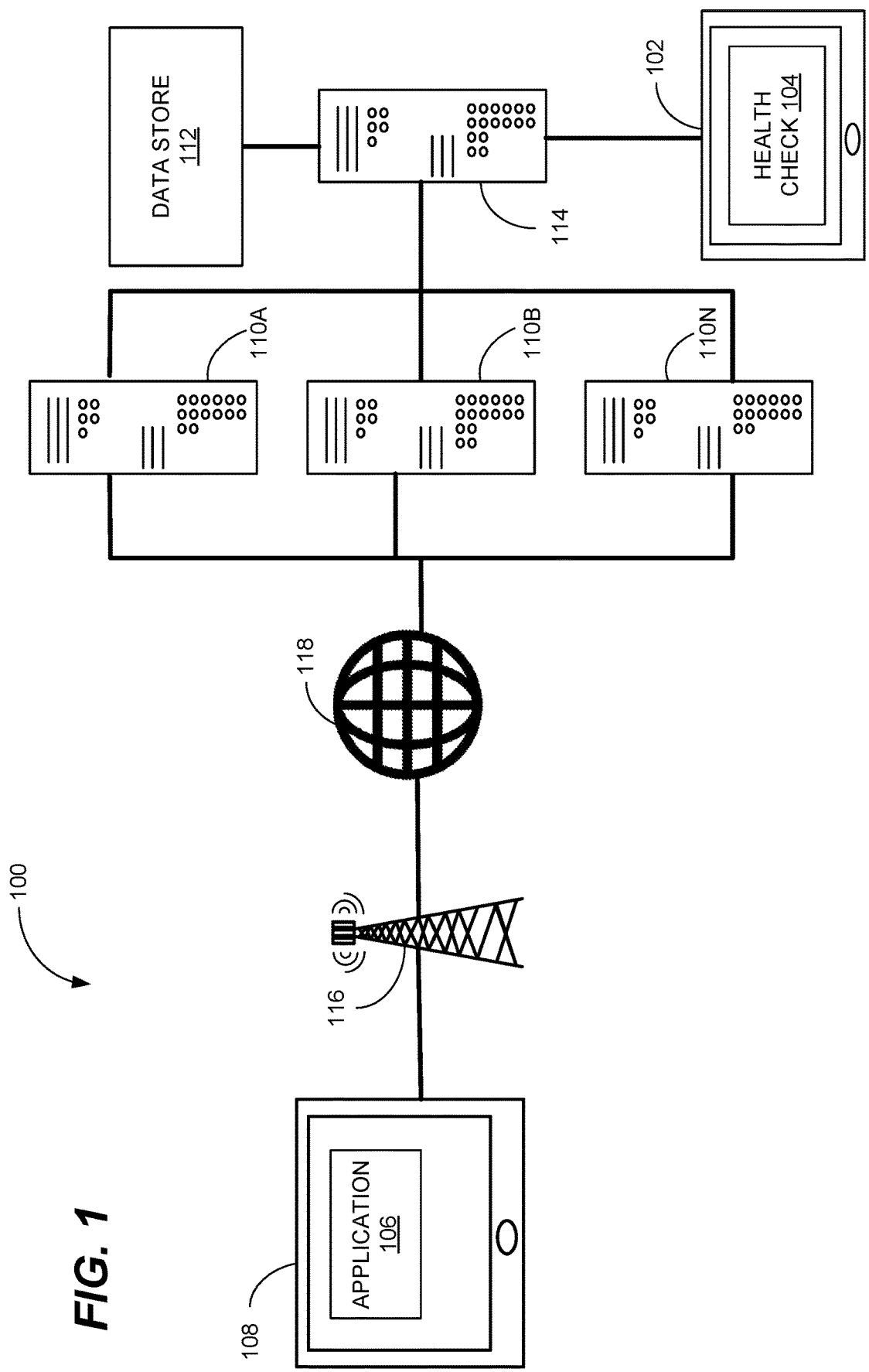
FIG. 1 depicts a system for providing clustered health checks, in accordance with some examples of the present disclosure.

Examples of the present disclosure can comprise systems and methods for providing clustered health checks. In some examples, the "health," or functional status, of various servers, data stores, and other computer resources used by an application to provide functionality for the application can be checked using a collection and grouping user interface in a browser or other application. When instantiated for use by the application, a computing resource used by the application is assigned an identifier, such as a uniform resource locator (URL).

The identifier assigned to the computing resource is stored in a list in an identifier datastore. The list is provided to a user, such as an engineer or developer of the application, for initializing a health check. The one or more URLs of the computing resources can be stored, for example, as bookmarks in a browser. The user can select the bookmark and the health check is commenced on the computing resource associated with the URL of the selected bookmark.

In some examples, the identifier can be grouped automatically or by the user to perform a specific health check. For example, the identifiers of all data stores can be grouped together under one identifier and the identifiers for all servers can be grouped together under another identifier. Thus, instead of selecting all the identifiers for the data stores (or having to remember the identifiers for all the data stores), a single identifier may be selected. Once selected, the identifier initiates a group health check of all the identifiers associated with the selected identifier.

The identifiers can be grouped together for other reasons. A user may know that one or more servers/data stores/computing resources are critical for the application. For example, a computing resource may be geographically closest to users that use the application. Because of the geographic proximity of the computing resource to the users that use the application, the use of the computing resource may help reduce latency over other computing resources that are geographically more distant. The identifiers of computing resources that help reduce latency may be grouped under a single identifier. Health checks can be specified to occur on a more regular basis for these specific computing resources because of their critical nature. Further, the health checks of these critical computing resources can be readily differentiated from health checks of other, potentially non-critical resources simply by grouping identifiers.

Some examples of the presently disclosed subject matter may help reduce costs, increase efficiency, and reduce human error. In some conventional systems, the amount of time that may be required for humans to find the right computing resources and perform health checks can be time consuming. Further, the selection process can introduce errors, as the human may not know the correct computing resource or incorrectly select a wrong computing resource upon which a health check is to be performed.

The systems and methods discussed herein are discussed generally with respect to cellular UEs, tablets, computers, and the like, and in terms of components (e.g., network entities) associated with Wi-Fi networks, Bluetooth networks, wired networks, fourth-generation (4G) and fifth-generation (5G) cellular networks, and other types of networks. The systems and methods can be used with other types of equipment and on other types of networks. Thus, the systems and methods described herein are described in terms of the 4G and 5G networks merely because these networks represent the state of the current art. One of skill in the art will recognize, however, the systems and methods could also be used on other networks that provide video calling such as, for example, Internet of Things (IoT), machine-to-machine (M2M), sixth-generation (6G), and other current and future networks.

As shown in FIG. 1, examples of the present disclosure can comprise a system 100 for providing clustered health checks. The system 100 includes a user equipment (UE) 102 running a health check application 104. The UE 102 may be associated with the monitoring and/or maintenance of computing resources. The health check application 104 is configured to perform multiple operations, but, is generally designed to provide for the grouping of identifiers of various computing resources used for an application 106 to be run on a user's user equipment (UE) 108. The health check application 104 receives information such as which computing resources 110A-110N (hereinafter collectively referred to as "the computing resources 110" and individually as "the computing resource 110A," the computing resource 110B," and so forth) are to be used by the application 106. For example, the application 106 may need the computing resource 110A and the computing resource 110B to be servers to host various aspects of the application 106. Further, the application 106 may use the computing resource 110N as a data store to store data associated with the use of the application 106.

The health check application 104 queries the computing resources 110A, 110B, and 110N after being identified as computing resources 110 associated with the use of the application 106, and, queries the associated computing resources 110 for an identifier associated with the associated computing resources 110. In some examples, the identifier may be a uniform resource locator (URL) associated with the computing resources 110. Other types of identifiers may be used and are considered to be within the scope of the presently disclosed subject matter including, but not limited to, an Internet Protocol (IP) address, a node address in the case of a node, or any other information that may be used to find and access the particular computing resources 110. It should be noted that in some examples, however, the identifiers may be generated at the runtime of the health check application 104, such as when the application 106 is being executed.

Once the identifier is received, the health check application 104 stores the identifiers in a data store 112. It should be noted that the identifiers may be stored in other storage locations, the data store 112 merely being an example. To store the identifiers, the health check application 104 communicates with a parallel executor server 114. The parallel executor server 114 receives the identifiers from the computing resources 110. Further, the health parallel executor server 114 associates health check commands with the identifiers stored in the data store 112, described in more detail in the following figures. Using the application 106, the UE 108 can be in communication with a cellular wireless base station (WBS) 116. The WBS 116, along with various other network systems (not illustrated) can provide the UE 108 with a cellular voice and/or data connection to the World Wide Web 118. The computing resources 110 can be accessed by the application 106 using the World Wide Web 118, or other communication services.

Returning to the parallel executor server 114, once the identifiers are received and stored in the data store 112, the identifiers are associated with a health check identifier and a command string. The health check identifier is used to communicate with the parallel executor server 114 rather than the computing resources 110. The command string is used to initiate a health check using a health check command code on the computing resource 110 associated with the identifier when the identifier is selected. For example, as described in more detail in FIG. 2, the identifier may be a URL associated with the computing resource 110A. A health check URL may be stored in the data store 112. The health check URL may be provided to the health check application 104 and/or directly to another application such as an Internet browser. The health check URL may be entered into an address bar of the browser. Once the parallel executor server 114 receives the health check URL, the parallel executor server 114 sends a health check command code (or health check command) to the URL associated with the health check URL. The health check information is transmitted to the parallel executor server 114, and in turn, provided to the health check application 104 or another application like a browser.

In some examples, more than one URL of the computing resources may be associated with one health check URL. In that regard, entering one health check URL in the address bar of a browser or other application may initiate health checks on multiple computing resources 110 grouped into the single health check URL. Once the single health check URL is received by the parallel executor server 114, the parallel executor server 114 determines the URLs of the computing resources 110 associated with the grouped, single URL. The parallel executor server 114 transmits a health check command code to the computing resources 110 associated with the grouped URL. Once the health check information is received from the computing resources 110, the health check information is provided to the UE 102.

Figure 2:
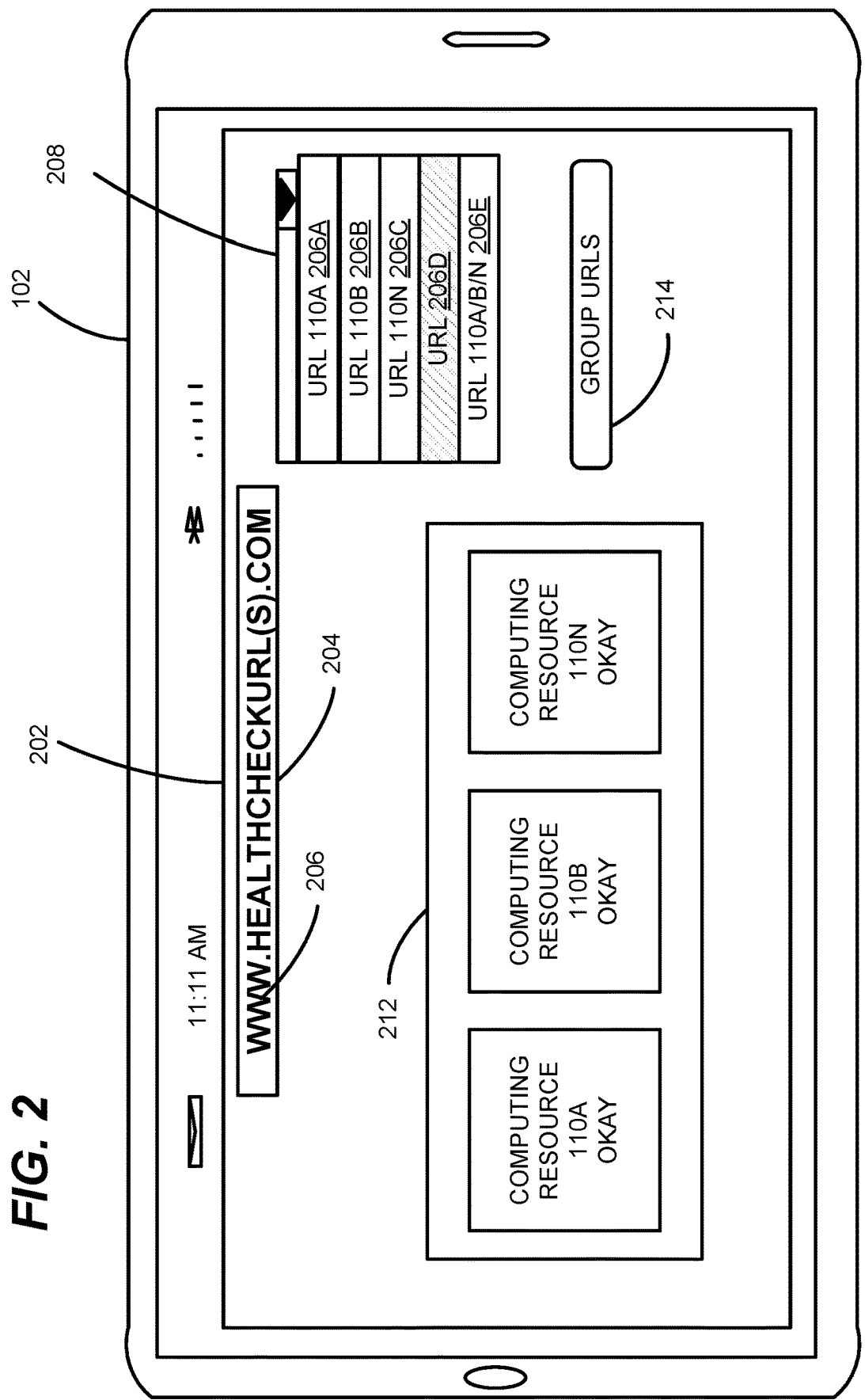
FIG. 2 is an illustration of a browser integrated with a health check application rendered on a user equipment that may be used for providing clustered health checks, in accordance with some examples of the present disclosure.

FIG. 2 is an illustration of a browser 202 integrated with the health check application 104 rendered on the user equipment 102 that may be used for providing clustered health checks. The browser 202 includes an address bar 204 configured to receive a URL 206. The URL 206 is associated with one or more of the computing resources 110 illustrated in FIG. 1, above. The URL 206 may be provided in a bookmarks bar 208.

The bookmarks bar 208 is a listing of URLs 206 that may be used to perform health checks on one or more applications. The bookmarks bar 208 may indicate the URLs 206 (hereinafter collectively referred to as "URLs 206" and individually as "URL 206A," the URL 206B," and so forth) in different manners to indicate the association with different applications. For example, URLs 206A, 206B, and 206D may be associated with the computing resources 110 used by the application 106. Displayed in a different manner, URL 206D may be associated with another application.

Once entered, the URL 206 entered in the address bar 204 is received by the parallel executor server 114. The parallel executor server 114 determines the URLs of the computing resources 110 associated with URL 206. The parallel executor server 114 transmits a health check command code to the computing resources 110 associated with the URL 206. Once the health check information is received from the computing resources 110, the health check information is provided to the UE 102 and rendered in the health check status user interface 212. The health check status user interface 212 can include an identification of the computing resources 110 upon which a health check was performed, health check information of the computing resources 110, and a status of the computing resources 110.

As noted above, the URLs 206 may be grouped together so that a single URL may be used to perform health checks on multiple computing resources 110. In this example, group user interface (UI) 214 is provided. The group UI 214 is configured to receive a selection input. Once selected, the group UI 214 allows a user to select one or more of the URLs 206 A-D to be selected for grouping. For example, once the group UI 214 receives a selection input, a user may select the URLs 206A, 206B, and 206C to be grouped together. Once grouped, a group uniform resource locator (URL) 206E is generated. The URL 206E is indicated as a grouping for computing resources 110A, 110B, and 110N. If the group URL 206E is selected, when received by the parallel executor server 114, the parallel executor server 114 determines the URLs of the computing resources 110 associated with URL 206E. Thus, in lieu of selecting individual URLs, the user can select a group. The parallel executor server 114 transmits a health check command code to the computing resources 110A-N associated with the URL 206E. Once the health check information is received from the computing resources 110A-N, the health check information is provided to the UE 102 and rendered in the health check status user interface 212.

Figure 3:
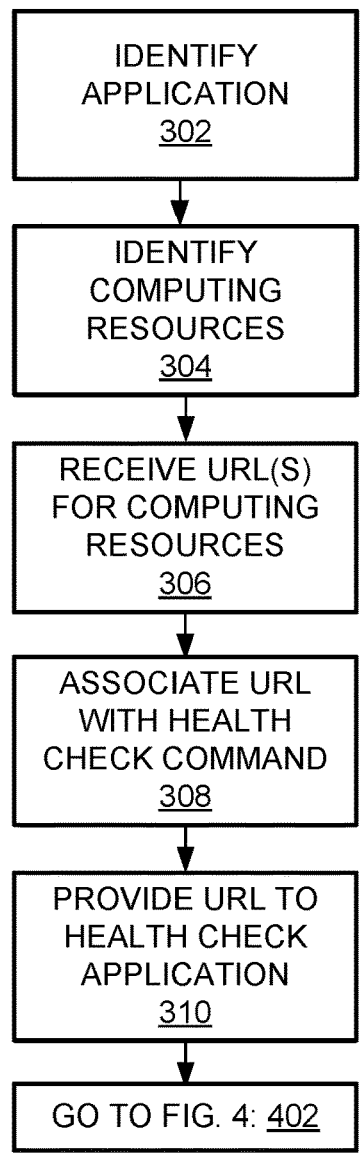
FIG. 3 is an illustrative process for establishing identifiers to provide clustered health checks, in accordance with some examples of the present disclosure.

FIG. 3 is an illustrative process 300 for establishing identifiers to provide clustered health checks, in accordance with some examples of the present disclosure. The process and other processes described herein are illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Referring to FIG. 3, the process 300 commences at operation 302, where the application 106 to be checked is identified. The presently disclosed subject matter is not limited to any particular type of application for the application 106. For example, the application 106 can be, but is not limited to, a locally-run application (i.e. where the application operates completely on the user equipment 108), an application hosted on a remote service, or various combinations thereof.

The process 300 continues to operation 304, where the computing resources 110 necessary to operate or provide services for the application are identified. The presently disclosed subject matter is not limited to any particular type of the computing resources 110. For example, the computing resources 110 can be, but are not limited to, servers, nodes, data stores, network services, and the like.

The process 300 continues to operation 306, where uniform resource locators (URLs) are received for the computing resources 110 identified in operation 304. Although URLs are used in process 300, the use of URLs is merely exemplary, as other types of identifiers may be used. As used herein, an identifier is an address or location to which the computing resources 110 can be individually identified and communicated with.

The process 300 continues to operation 308, where the URLs are associated with health check commands. In this manner, when a URL is entered, the URL is combined with a command that, when received, causes the performance of a health check and the transmission of the health check to the querying entity. In this manner, the input of an identifier (in these examples, the URLs) automatically invokes a command to perform a health check. Therefore, the transmission is a combination of the identifier to locate and communicate with the particular computing resource 110, as well as, a command to perform a health check and transmit the results to the querying unit. The URLs (or other identifiers) along with their associated health check command strings may be stored in the data store 112 or other accessible data store. In some examples, the URLs (or other identifiers) along with their associated health check command strings may be stored in other locales, such as the user equipment 102.

The process 300 continues to operation 310, where the URLs are provided to the health check application 104. As noted above, other types of identifiers may be provided.

The process 300 continues to operation 402 of process 400, described in more detail in FIG. 4, below.

Figure 4:
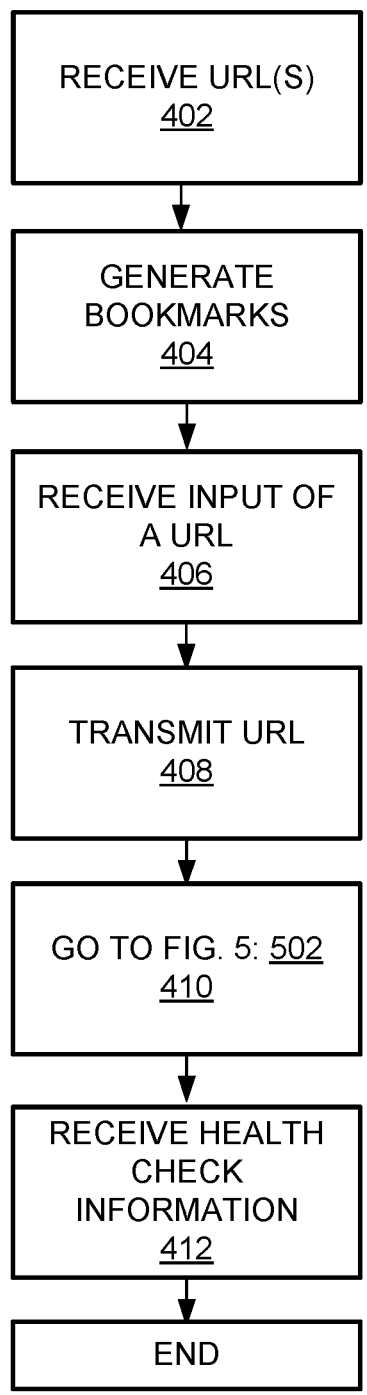
FIG. 4 is an illustrative process for using a health check application, in accordance with some examples of the present disclosure.

FIG. 4 is an illustrative process 400 for using the health check application 104, in accordance with some examples of the present disclosure.

The process 400 commences at operation 402, where the URLs of process 300 are received at the user equipment 102 executing the health check application 104. The URLs may be provided upon a query from the health check application 104 or as part of a process, such as when the application 106 is undergoing development. For example, a notification may be received at the user equipment 102 that there may be issues with the application 106, such as lag or data issues.

A user operating user equipment 102 may receive an identification that the application 106 is not operating optimally. The user may select a "GET URLs" input for the application 106. The health check application 104, after receiving the "GET URLs" input, queries the parallel executor server 114. The parallel executor server 114 queries the data store 112 for the URLs and the health check commands for the computing resources 110 associated with the application 106. The information is passed to the health check application 104. In some examples, the parallel executor server 114 may execute a health check operation upon the receipt of a notification that the application 106 is not running optimally without requiring an input such as the selection of the URLs 206 or other input from a user. In some examples, the notification may include which of the computing resources 110 are not running optimally, and therefore, the health check operation may be performed just on the particular computing resource rather than all computing resources 110.

The process 400 continues to operation 404, where bookmarks to be provided in a bookmarks bar 208 are generated for the URLs received. It should be noted that the presently disclosed subject matter is not limited to the rendering of the URLs 206 in bookmark format, as other types of formats may be used, including selectable links, lists, and the like. Further, the URLs may be received at other points in the operation of the health check application 104. For example, the health check application 104 may query for and receive the URLs 206 before any notification of issues, at various stages of development of the application 106, or any other time in which the computing resources 110 have been, or are being, identified.

The process 400 continues to operation 406, where an input of one of the URLs 206 is received. In some examples, the URLs 206 may be grouped or otherwise segregated. In this matter, the input may be for the particular grouping of URLs 206 rather than a single URL 206.

The process 400 continues to operation 408, where the URLs are transmitted to the parallel executor server 114.

The process 400 continues to operation 502 of process 500.

Figure 5:
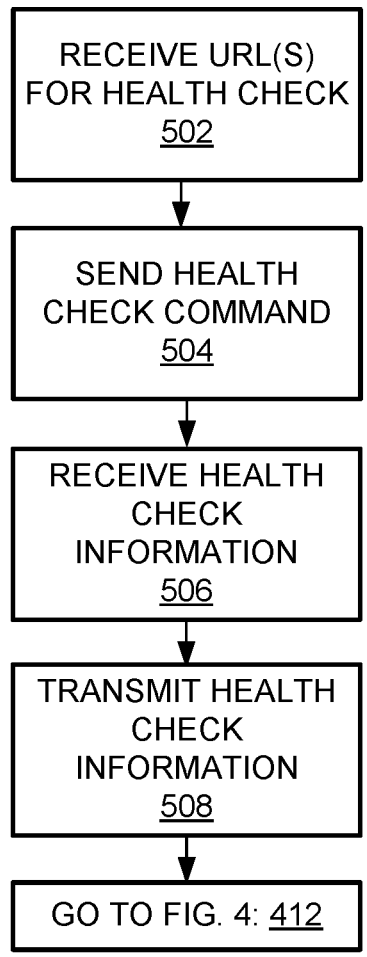
FIG. 5 is an illustrative process for executing a health check command by a parallel executor server, in accordance with some examples of the present disclosure.

FIG. 5 is an illustrative process 500 for executing a health check command by the parallel executor server 114, in accordance with some examples of the present disclosure.

The process 500 commences at operation 502, where the URLs that are transmitted pursuant to operation 408 of the process 400 are received by the parallel executor server 114.

The process 500 continues to operation 504, where the parallel executor server 114 transmits a health check command code to the computing resources 110 associated with the URL 206 that were receive at operation 502.

The process 500 continues to operation 506, where the health check information is received at the parallel executor server 114 for the queried computing resources 110.

The process continues to operation 508, where the health check information is transmitted to the health check application 104.

The process 500 continues to operation 412 of process 400, where the health check information is received at the health check application 104. The health check information may be rendered in a user interface for reference. The process 400 thereafter ends, thus ending processes 300 and 500.

Figure 6:
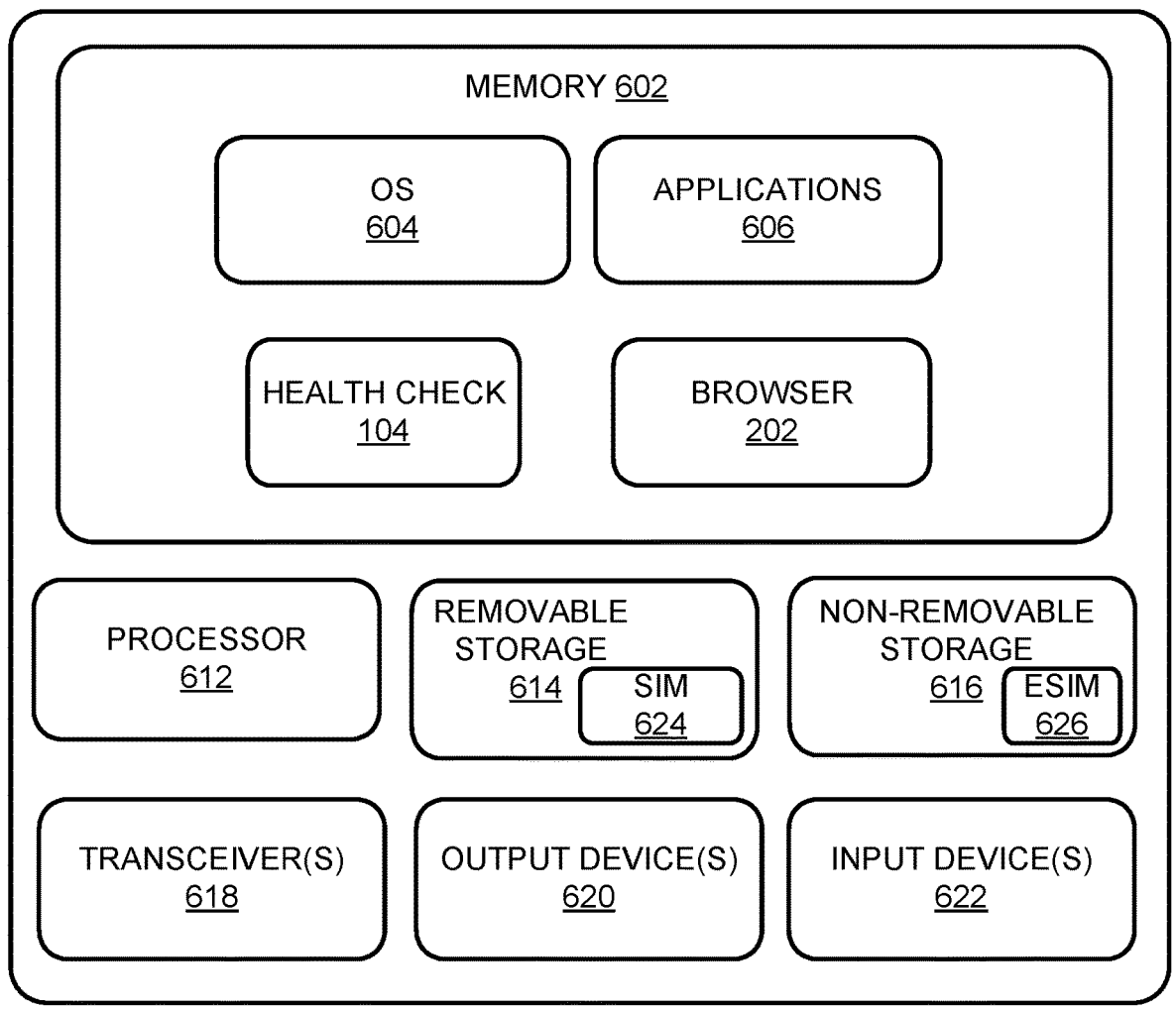
FIG. 6 depicts a component level view of a user equipment for use with the systems and methods described herein.

FIG. 6 depicts a component level view of the UE 102 for use with the systems and methods described herein. The UE 102 could be any UE capable of making audio and/or video calls on a cellular network, an internet multimedia subsystem, and/or an IP network. For clarity, the UE 102 is described herein generally as a cell phone, smart phone, or laptop computer. One of skill in the art will recognize, however, that the systems and methods described herein can also be used with a variety of other electronic devices, such as, for example, tablet computers, desktops, and other network connected devices. Indeed, the UE 102 can be any device that can send and receive video calls, audio calls, and/or messaging that can benefit from improved call management.

The UE 102 can comprise several components to execute the above-mentioned functions. As discussed below, the UE 102 can comprise memory 602 including an operating system (OS) 604 and one or more standard applications 606. The standard applications 606 can include many features common to UEs such as, for example, calendars, call logs, voicemail, etc. In this case, the standard applications 606 can also comprise a video call application, an audio call application, and a messaging application to enable users to engage in audio calls, video calls, and messaging, among other things. The standard applications 606 can also include contacts to enable the user to select a contact to initiate, for example, a video call, audio call, text message, etc.

The UE 102 can also comprise the health check application 104. As mentioned above, the health check application 104 can be used to receive, select, and group URLs of the computing resources 110 associated with the application 106. The health check application 104 communicates with a parallel executor server 114 to request and receive health check information.

The UE 102 can also comprise one or more processors 612 and one or more of removable storage 614, non-removable storage 616, transceiver(s) 618, output device(s) 620, and input device(s) 622. In some examples, such as for cellular communication devices, the UE 102 can also include a SIM 624 and/or an embedded SIM (eSIM) 626, which can include a mobile country code (MCC), mobile network code (MNC), international mobile subscriber identity (IMSI), cellular phone number, and other relevant information. In some examples, one or more of the functions of the health check application 104 can be stored on the SIM 624 or the eSIM 626 in addition to, or instead of, being stored in the memory 602.

In various implementations, the memory 602 can be volatile (such as random access memory (RAM)), nonvolatile (such as read only memory (ROM), flash memory, etc.), or some combination of the two. The memory 602 can include all, or part, of the health check application 104 or a URL listing, among other things. In some examples, rather than being stored in the memory 602, some, or all, of the health check application 104, and other information (e.g., a listing of URLs) can be stored on a remote server or a cloud of servers accessible by the UE 102.

The memory 602 can also include the OS 604. Of course, the OS 604 varies depending on the manufacturer of the UE 102. The OS 604 contains the modules and software that support a UE's basic functions, such as scheduling tasks, executing applications, and controlling peripherals. In some examples, the OS 604 can enable the health check application 104, and provide other functions, as described above, via the transceiver(s) 618. The OS 604 can send information to a graphical user interface (GUI) (not shown), for example, to cause the GUI to display the URLs 206 in the bookmarks bar 208. The OS 604 can also receive inputs from the GUI to cause the UE 102 to use the standard applications 606 for some functions, while other functions are handled in the health check application 104, among other things. The OS 604 can also enable the UE 102 to send and retrieve other data and perform other functions.

The UE 102 can also comprise one or more processors 612. In some implementations, the processor(s) 612 can be a central processing unit (CPU), a graphics processing unit (GPU), both CPU and GPU, or any other processing unit. The UE 102 may also include additional data storage devices (removable and/or non-removable) such as, for example, magnetic disks, optical disks, or tape. Such additional storage is illustrated in FIG. 6 by removable storage 614 and non-removable storage 616.

Non-transitory computer-readable media may include volatile and nonvolatile, removable and non-removable tangible, physical media implemented in technology for storage of information, such as computer readable instructions, data structures, program modules, or other data. The memory 602, removable storage 614, and non-removable storage 616 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the UE 102. Any such non-transitory computer-readable media may be part of the UE 102 or may be a separate database, databank, remote server, or cloud-based server.

In some implementations, the transceiver(s) 618 include any transceivers known in the art. In some examples, the transceiver(s) 618 can include wireless modem(s) to facilitate wireless connectivity with other components (e.g., between the UE 102), the Internet, and/or an intranet. Specifically, the transceiver(s) 618 can include one or more transceivers that can enable the UE 102 to send and receive video calls, audio calls, and messages and to perform other functions. Thus, the transceiver(s) 618 can include multiple single-channel transceivers or a multi-frequency, multi-channel transceiver to enable the UE 102 to send and receive video calls, audio calls, messaging, etc. The transceiver(s) 618 can enable the UE 102 to connect to multiple networks including, but not limited to the 2G, 3G, 4G, 5G, and Wi-Fi networks. The transceiver(s) can also include one or more transceivers to enable the UE 102 to connect to future (e.g., 6G) networks, Internet-of-Things (IoT), machine-to machine (M2M), and other current and future networks.

The transceiver(s) 618 may also include one or more radio transceivers that perform the function of transmitting and receiving radio frequency communications via an antenna (e.g., Wi-Fi or Bluetooth®). In other examples, the transceiver(s) 618 may include wired communication components, such as a wired modem or Ethernet port, for communicating via one or more wired networks. The transceiver (s) 818 can enable the UE 102 to make audio and video calls, download files, access web applications, and provide other communications associated with the systems and methods, described above.

In some implementations, the output device(s) 620 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen, or display, on which the GUI can be displayed. The output device(s) 620 can also include speakers, or similar devices, to play sounds or ringtones when an audio call or video call is received. Output device(s) 620 can also include ports for one or more peripheral devices, such as headphones, peripheral speakers, or a peripheral display.

In various implementations, input device(s) 622 include any input devices known in the art. For example, the input device(s) 622 may include a camera, a microphone, or a keyboard/keypad. The input device(s) 622 can include a touch-sensitive display or a keyboard to enable users to enter data and make requests and receive responses via web applications (e.g., in a web browser), make audio and video calls, and use the standard applications 606, among other things. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can be used to display the GUI, for example, and to act as both an input device 622 and an output device 620.

The presently disclosed examples are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising: receiving, at a parallel executor server, a first identifier associated with a first computing resource used in conjunction with an execution of an application and a second identifier associated with a second computing resource used in conjunction with the execution of the application;
    generating a first health check command code for the first computing resource and a second health check command code for the second computing resource, the first health check command code including a first request for a first response of first health check information from the first computing resource and the second health check command code including a second request for a second response of second health check information from the second computing resource;
    generating a first link comprising the first identifier and the first health check command code; and
    generating a second link comprising the second identifier and the second health check command code, wherein selecting the first link or the second link causes the parallel executor server to execute the first health check command code and the second health check command code.

2. The method of claim 1, further comprising:
    receiving a selection of the first link from a user equipment;
    connecting with the first computing resource using the first identifier associated with the first link;
    transmitting the first health check command code to the first computing resource;
    receiving the first health check information from the first computing resource; and
    transmitting the first health check information to the user equipment.

3. The method of claim 1, further comprising: receiving, from a user equipment, a first selection of the first link and a second selection of the second link;
    connecting with the first computing resource using the first identifier associated with the first link and the second computing resource using the second identifier associated with the second link;
    transmitting the first health check command code to the first computing resource and the second health check command code to the second computing resource;
    receiving the first health check information and the second health check information; and
    transmitting the first health check information and the second health check information to the user equipment.

4. The method of claim 1, wherein the first link or the second link is a uniform resource locator (URL), an Internet Protocol address, or a node address.

5. The method of claim 1, further comprising: receiving a notification that the first computing resource has failed to meet a performance threshold;
    identifying the first link associated with the first computing resource;
    transmitting the first health check command code to the first computing resource;
    receiving the first health check information; and
    transmitting the first health check information to a user equipment associated with maintenance of the first computing resource.

6. The method of claim 1, further comprising:
    receiving a notification that the application has failed to meet a performance threshold;
    identifying the first computing resource and the second computing resource associated with the application;
    retrieving the first health check command code to the first computing resource and the second health check command code to the second computing resource;
    identifying the first link associated with the first computing resource and the second link associated with the second computing resource;
    transmitting the first health check command code to the first computing resource using the first link and the second health check command code to the second computing resource using the second link;
    receiving the first health check information and the second health check information; and
    transmitting the first health check information and the second health check information to a user equipment associated with maintenance of the application.

7. The method of claim 1, further comprising: transmitting the first link and the second link to a user equipment requesting the first link and the second link.

8. A system comprising:
    one or more processors; and
    one or more non-transitory computer-readable media storing instructions executable by the one or more processors, wherein the instructions, when executed, cause the system to perform operations comprising:
    receiving, at a parallel executor server, a first identifier associated with a first computing resource used in conjunction with an execution of an application and a second identifier associated with a second computing resource used in conjunction with the execution of the application;
    generating a first health check command code for the first computing resource and a second health check command code for the second computing resource, the first health check command code including a first request for a first response of first health check information from the first computing resource and the second health check command code including a second request for a second response of second health check information from the second computing resource;

generating a first link comprising the first identifier and the first health check command code; and generating a second link comprising the second identifier and the second health check command code, wherein selecting the first link or the second link causes the parallel executor server to execute the first health check command code and the second health check command code.

9. The system of claim 8, the operations further comprising:

receiving a selection of the first link from a user equipment;

connecting with the first computing resource using the first identifier associated with the first link;

transmitting the first health check command code to the first computing resource;

receiving the first health check information from the first computing resource; and transmitting the first health check information to the user equipment.

10. The system of claim 8, the operations further comprising:

receiving, from a user equipment, a first selection of the first link and a second selection of the second link;

connecting with the first computing resource using the first identifier associated with the first link and the second computing resource using the second identifier associated with the second link;

transmitting the first health check command code to the first computing resource and the second health check command code to the second computing resource;

receiving the first health check information and the second health check information; and transmitting the first health check information and the second health check information to the user equipment.

11. The system of claim 8, wherein the first link or the second link is a uniform resource locator (URL), an Internet Protocol address, or a node address.

12. The system of claim 8, the operations further comprising:

receiving a notification that the first computing resource has failed to meet a performance threshold;

identifying the first link associated with the first computing resource;

transmitting the first health check command code to the first computing resource;

receiving the first health check information; and transmitting the first health check information to a user equipment associated with maintenance of the first computing resource.

13. The system of claim 8, the operations further comprising:

receiving a notification that the application has failed to meet a performance threshold;

identifying the first computing resource and the second computing resource associated with the application;

retrieving the first health check command code to the first computing resource and the second health check command code to the second computing resource;

identifying the first link associated with the first computing resource and the second link associated with the second computing resource;

transmitting the first health check command code to the first computing resource using the first link and the second health check command code to the second computing resource using the second link;

receiving the first health check information and the second health check information; and transmitting the first health check information and the second health check information to a user equipment associated with maintenance of the application.

14. The system of claim 8, the operations further comprising:

transmitting the first link and the second link to a user equipment requesting the first link and the second link.

15. A non-transitory computer-readable media storing computer-executable instructions, which when executed by one or more processors, cause the one or more processors to perform operations comprising:

receiving, at a parallel executor server, a first identifier associated with a first computing resource used in conjunction with an execution of an application and a second identifier associated with a second computing resource used in conjunction with the execution of the application;

generating a first health check command code for the first computing resource and a second health check command code for the second computing resource, the first health check command code including a first request for a first response of first health check information from the first computing resource and the second health check command code including a second request for a second response of second health check information from the second computing resource;

generating a first link comprising the first identifier and the first health check command code; and generating a second link comprising the second identifier and the second health check command code, wherein selecting the first link or the second link causes the parallel executor server to execute the first health check command code and the second health check command code.

16. The non-transitory computer-readable media of claim 15, the operations further comprising:

receiving a selection of the first link from a user equipment;

connecting with the first computing resource using the first identifier associated with the first link;

transmitting the first health check command code to the first computing resource;

receiving the first health check information from the first computing resource; and transmitting the first health check information to the user equipment.

17. The non-transitory computer-readable media of claim 15, the operations further comprising:

receiving, from a user equipment, a first selection of the first link and a second selection of the second link;

connecting with the first computing resource using the first identifier associated with the first link and the second computing resource using the second identifier associated with the second link;

transmitting the first health check command code to the first computing resource and the second health check command code to the second computing resource;

receiving the first health check information and the second health check information; and transmitting the first health check information and the second health check information to the user equipment.

18. The non-transitory computer-readable media of claim 15, wherein the first link or the second link is a uniform resource locator (URL), an Internet Protocol address, or a node address.

19. The non-transitory computer-readable media of claim 15, the operations further comprising:

receiving a notification that the first computing resource has failed to meet a performance threshold;

identifying the first link associated with the first computing resource;

transmitting the first health check command code to the first computing resource;

receiving the first health check information; and transmitting the first health check information to a user equipment associated with maintenance of the first computing resource.

20. The non-transitory computer-readable media of claim 15, the operations further comprising:

receiving a notification that the application has failed to meet a performance threshold;

identifying the first computing resource and the second computing resource associated with the application;

retrieving the first health check command code to the first computing resource and the second health check command code to the second computing resource;

identifying the first link associated with the first computing resource and the second link associated with the second computing resource;

transmitting the first health check command code to the first computing resource using the first link and the second health check command code to the second computing resource using the second link;

receiving the first health check information and the second health check information; and transmitting the first health check information and the second health check information to a user equipment associated with maintenance of the application.

\* \* \* \* \*